(12) United States Patent
Ingels et al.

(10) Patent No.: US 6,851,558 B2
(45) Date of Patent: Feb. 8, 2005

(54) METHOD AND A DEVICE FOR PROCESSING A SOLUTION, MELT, SUSPENSION, EMULSION, SLURRY OR SOLIDS INTO GRANULES

(75) Inventors: Rune Ingels, Stathelle (NO); Luc Vanmarcke, Lembeke (BE); Rudy Nevejans, Assenede (BE); Roeland Elderson, Axel (NL); Jon Gunstein Klonteig, Skien (NO)

(73) Assignee: Yara International ASA, Oslo (NO)

( * ) Notice: Subject to any disclaimer, the term of this patent is extended or adjusted under 35 U.S.C. 154(b) by 0 days.

(21) Appl. No.: 10/149,229

(22) PCT Filed: Dec. 4, 2000

(86) PCT No.: PCT/NO00/00410

§ 371 (c)(1),
(2), (4) Date: Oct. 25, 2002

(87) PCT Pub. No.: WO01/43861

PCT Pub. Date: Jun. 21, 2001

(65) Prior Publication Data

US 2003/0098264 A1 May 29, 2003

(30) Foreign Application Priority Data

Dec. 15, 1999 (NO) ................................................ 996227

(51) Int. Cl.⁷ .............................................. B07B 4/00
(52) U.S. Cl. ...................................... 209/476; 209/493
(58) Field of Search ................................ 209/474, 475, 209/476, 492, 493, 454, 455, 456, 460, 461; 427/182, 213, 421

(56) References Cited

U.S. PATENT DOCUMENTS

| 775,948 | A | * | 11/1904 | Stebbins | 209/475 |
|---|---|---|---|---|---|
| 923,455 | A | * | 6/1909 | Stebbins | 209/474 |
| 2,147,234 | A | * | 2/1939 | Bird et al. | 209/155 |
| 3,804,250 | A | * | 4/1974 | Dankesreiter | 209/475 |
| 4,219,589 | A | | 8/1980 | Niks et al. | |
| 4,466,542 | A | * | 8/1984 | Oetiker et al. | 209/44.2 |
| 4,536,418 | A | | 8/1985 | Goldsmith | |
| 4,652,362 | A | * | 3/1987 | Mueller | 209/44.2 |
| 5,470,387 | A | | 11/1995 | Liborius | |

FOREIGN PATENT DOCUMENTS

| DE | 3808277 | 9/1989 |
|---|---|---|
| EP | 0384827 | 8/1990 |
| EP | 0900589 | 3/1999 |
| GB | 1132925 | 11/1968 |
| JP | 62-282629 | 12/1987 |
| SU | 921617 | 4/1982 |
| SU | 921618 | 4/1982 |
| WO | 97/02887 | 1/1997 |
| WO | 00/45959 | 8/2000 |

* cited by examiner

Primary Examiner—Donald P. Walsh
Assistant Examiner—Joseph Rodriguez
(74) Attorney, Agent, or Firm—Wenderoth, Lind & Ponack, L.L.P.

(57) ABSTRACT

A classifying fluid bed granulator includes a granulation chamber including a fluidizing air chamber (7) with a bed floor (10), a ceiling (3c), an end wall (3d), and a feed inlet (5), a seed inlet (6), an air outlet (4) defined by walls (3a, 3b) and an outlet (9) for produced granules. The granulation chamber is divided into an agglomeration and seed control section (1) and a granulation and classification section (2), and the section (2) includes one or more consecutive compartments having an asymmetric design.

21 Claims, 9 Drawing Sheets

Classifying Fluid Bed, Open Design, Side View

Figure 1. Classifying Fluid Bed, Open Design, Side View

Figure 2. Classifying Fluid Bed, Camber Design, Side View

Figure 3. Classifying Fluid Bed detail of classifying effects

Figure 4. Classifying Fluid Bed, Typical geometry of V-shaped baffles

Figure 5. Classifying Fluid Bed with V-shaped baffles, Top View

2) Areas marked with 2, indicates where small particles are moving downwards
3) Areas marked with 3, indicate where larger particles are moving upwards in a turbulent bubbeling area.

Figure 6 is showing the side view of the Fluid Bed pilot plant

Figure 7. Calculation of Classification efficiency

Figure 8. Results dynamic test

Figure 9. Calculation of Classification efficiency

METHOD AND A DEVICE FOR PROCESSING A SOLUTION, MELT, SUSPENSION, EMULSION, SLURRY OR SOLIDS INTO GRANULES

BACKGROUND OF THE INVENTION

The present invention relates to a method and a device for processing a solution, melt, suspension, emulsion, slurry or solids into granules of a classified size.

Fluid bed granulation or fluidized bed granulation is a technique used in particulation of melts, solutions, slurries, emulsions, suspensions or solids, for instance in the fertilizer and food industries.

A fluid bed granulation process combines several sciences and technologies. To operate a fluid bed granulation plant properly, knowledge of melt and solution chemistry, crystallization properties, total mass- and energy balance, mass- and energy transport, particle- and granulometry balance, fluid dynamics and fluidization technology are required.

To design and operate these plants is difficult due to the fact that the mass balance, energy balance and granulometry balance must be set correctly to give the right performance with regard to capacity and quality. Each of the balances can not be set independently as most of the control parameters available to operators and designers affect all three balances. The balances expressed as a limited and simplified set of equations will also have several solutions, where the optimum or best solution depends on the chemical and physical properties of the product system, product quality and cost of utilities and other input factors.

Different salt systems have different solubilities and different heats of crystallization. In fluid bed design, these differences give a variety of design parameters and settings for air flow and temperature, recycle flow and temperature, melt temperature and concentration. The most important factor for the fluid bed granulation process is the control of the liquid phase together with the overall energy balance and granulometry balance through the particle growth and the production of seed particles.

A seed particle is defined as a particle too large to be carried out with the exhaust airflow through the granulator, large enough to prevent being agglomerated with other particles, and smaller than the desired product size.

In a conventional fluid bed granulation process, the size distribution of the produced granules has been controlled by recycling a certain fraction of undersized granules and crushed oversized granules to the granulator. This eases the operation and the flexibility of the process, making it possible to handle various systems and granulometry, and still be able to control the conditions in the fluid bed (i.e., the liquid phase and the crystallization evaporation rate). The fact that a fluidized bed granulator operates as a total mixed reactor has further supported the robust design and operational philosophy.

An excessive recycle stream, 0.5 to 2 times the product flow, carrying an excess of seed granules and mass flow, limits the influence of and sensitivity to other operating parameters. This has limited the interest in developing classifying granulators. Fluid bed granulation processes are sensitive to the number of seed particles produced, as agglomeration is undesired and should be avoided from a product quality and operating stability point of view. Agglomeration creates particles with lower crushing strength and it is difficult to use agglomeration to control the particle balance without increasing the recycle ratio to 3–7. A robust design with an excess recycle stream as an important control parameter, has been preferred by the industry. A low recycle flow is only possible.

A classifying fluid bed granulator is defined as a granulator that is able to discharge the product that is the largest granule fraction contained in the bed. The product continuously has a granule size which is larger than the granules in the granulator. The efficiency of the classification depends on the methods applied for classification and the size differences handled by the bed. A classifying granulator will, in a dynamic process, give a shorter retention time for the desired product fraction of large granules, thus giving a longer retention time for the smaller granules, enabling them to grow more before reaching the product size and be discharged. A classifying granulator will also be able to perform as an ideal plug flow reactor, given a feed of uniform seed material. Screening and recycling of the granules in conventional fluid bed granulators is always done outside the bed as, for instance, described in U.S. Pat. No. 4,219,589.

Building mechanical screening and crushing into or close to the fluid bed granulator is described in DE 3248504-C2, but has-been seen as not advantageous from an operational point of view.

However, U.S. Pat. No. 4,790,487 describes a continuous granulator where screening and recycling is done in an adjacent unit being a combined screw conveyor and fluid bed. The patent describes an apparatus comprising a granulator body for continuously processing powdered materials into granules and a screw conveyor for discharging the produced granules from the granulator body. The screw conveyor includes means for pneumatically classifying the produced granules while they are being conveyed. The patented principle will only be able to separate and recycle the dust or fine particles from the discharge flow. The classification efficiency in the method is based on the difference in escape velocity between the large onsize granules and the dust fraction, and will not be able to separate 1–2 mm particles out of a mass containing 1–5 mm particles. The bubble formation and slugging will create a flow of particles of all sizes between 1–5 mm back: to the granulator.

Internal segregation effects in fluidized, spouted and moving beds have been described in several publications. The effects of air velocity and bubble breaking constructions inside the bed have produced documented effects achieving a particle size difference between top and bottom in a single bed compartment. In "Powder Technology 98" (1998) 273–278, the effect of horizontal baffles are described and documented.

The bed design with the internal baffles results in a single chamber high bed with a subsequent high pressure drop. The total bed movement is reduced by both the baffles and the geometry, and the bed achieves a lower capacity because the heat and mass transfer requires turbulence and particle movement.

Another disadvantage, making these principles less useful, is the lack of horizontal classification. With a vertical classification effect only, size and shape of the granulator is limited in area to bed height ratio, and is therefore tested in a single chamber only. Horizontal baffles placed in the single granulator chamber, as described in WO 97/02887, is also seen as a practical disadvantage, as it gives less freedom to install spraying nozzles.

A significant disadvantage with a conventional but robust fluid bed process is the high investment costs in screens, crushers, dissolving units, dryers, coolers, intermediate storage and solid material transportation inside the plant. This requires large buildings and expensive steel constructions to enable an operable layout. Each mechanical and electrical item requires design, engineering, commissioning, spare parts, monitoring, maintenance, cleaning and attention from operators. In a corrosive environment due to salts and humidity, the quality of materials increases the investment cost further. The number of mechanical items increases the failure rate and risk of expensive down time.

Furthermore, operation of these granulation plants requires frequent stops for maintenance of mechanical and electrical equipment and cleaning of process equipment. Recovery of washing water and extra space inside the plants for maintenance activities further increases the cost for constructing and operating such plants. Reducing the recycle flow by optimizing the seed production and controlling the crystallization and solidification process has given some competitive advantages for the best processes.

Thermodynamically it is possible to design a fluid bed process with no recycling of cooled or heated granules outside the fluid bed. An optimum heat balance over a fluid bed granulator can be achieved by changing air temperature or air flow. A relatively large air flow is required anyway for the fluidization itself. The heat balance can alternatively be solved by internal cooling or heating in the fluid bed itself.

However, to operate a fluid bed granulation process without recycling material requires a control of the granule growth in a different way than in conventional beds mentioned above. Granule growth and product granulometry in conventional beds are a function of size distribution of feed or crushed recycled material, the feed to melt ratio, and classifying effects in the fluid bed or granulator. Conventional beds have low classifying efficiency, operating almost like, a total mixed flow reactor. The product from a total mixed reactor will consist of a mix of fresh undersized feed and matured larger particles. Even with an ideal plug flow reactor, the product is largely dependent on the size distribution of the feed or recycled material.

SUMMARY OF THE INVENTION

It is an object of the present invention to provide a method and a device which are able to process a solution, melt, suspension, slurry, emulsion or solids into granules of a classified size.

It is another object of the present invention to provide a method and a device which are able to process a solution, melt, suspension, slurry, emulsions or solids into granules in one stage, in one fluidized bed, without screening, recycling, crushing and dissolving.

Furthermore, it is another object of the present invention to provide a method and a device mentioned above which reduce the investment cost for a fluid bed granulator unit, and increase the capacity when introduced in existing plants.

The inventors have developed a method and a device for fluid bed granulation which are able to process a melt, solution, solid, emulsion, slurry or suspension into granules of a narrow size distribution.

The classifying fluid bed granulator according to the present invention comprises a granulation chamber including a fluidizing air chamber 7 with a bed floor 10, a ceiling 3c, an end wall 3d, a feed inlet 5, a seed inlet 6, an outlet 4 defined by walls 3a,3b for air, and an outlet 9 for produced granules. The granulation chamber is divided into an agglomeration and seed control section (i.e., an agglomeration section) 1, and a granulation and classification section (i.e., a classification section) 2 where the section 2 consists of one or more consecutive compartments having an asymmetric design.

The method according to the present invention for fluid bed granulation of feed being a solution, slurry, melt, emulsion, suspension or solids into granules of a desired classified size, comprises that inlet seed particles to be granulated with the feed are given a controlled size in an agglomeration and seed section ahead of a granulation and classification section, and that the classification of the granules is performed in asymmetric compartments in the granulation and classification section.

The granulator consists of one or preferably several spray and particle growth compartments with an asymmetric design and with tilted (inclined) separation baffles which result in classification of particles in each compartment and transport of large particles towards the outlet and small particles towards the inlet of the bed.

The asymmetric design, obtained by tilting the separation baffles and sloping the bed floor, creates differentiations in fluidization air flow in various parts of the bed and within each compartment.

The classifying fluid bed granulator unit itself, according to the present invention, performs internally what the screens and recycle loop do in a conventional granulation loop. In the classifying fluid bed, the granules which are smaller than the desired product are given a longer residence time inside the bed, until they have grown to the desired product size. Thus, there will be no small particles which have to be recirculated. In a conventional bed, the smallest granules have to be recycled back to the bed to get a longer retention time. In the classifying fluid bed the large particles will have a short residence time. The conventional bed does not provide large particles with a shorter residence time, and small particles with a longer residence time. Thus, there will be a higher fraction of too large particles produced in the bed. This together with the granule growth balance requires a continuous crushing of oversize particles.

In the classifying fluid bed, a controlled crushing can can, however, be introduced in the form of a rotor with variable speed placed in the seed and agglomeration control compartment. This will be required to produce enough seed material for the granulometry balance.

The dependence on the feed seed granulometry is reduced. From the granulometry aspect it is basically the number of seed particles and enlargement factor which determine the capacity.

The effect of segregation in a sliding mass of inhomogeneous particles is known but not utilized in a fluid bed granulator design. The segregation in a vibrated mass called percolation, where dust and smaller particles fall down between the larger granules, is also not utilized. This effect is more pronounced when movement is low, and will in a fluid bed be prevented or reversed by the air flow.

Segregation in a sliding or moving mass is utilized in pan granulation and in some drum granulators, but the mass and energy balance for these granulation processes normally requires a well defined and large amount of temperature controlled recycle material.

An important features of the design is the asymmetry provided by the tilting baffle plates and/or the sloping of the floor. The higher fluidization velocity towards the outlet of the bed, combined with the sloped ceiling towards the outlet, produces a circular flow pattern both in the total bed and between the tilted baffles. The higher air velocity and kinetic energy input on one side produces a higher bed level due to the lower density. This results in an effect where small particles on the top of the bed float back to the agglomeration and seed control section, and the largest particles float along the floor due to the circular flow between the plates or inside each chamber, and an overall circulating flow is produced.

Between compartments and over each plate, a stagewise classification is obtained by creating a high velocity bubble zone for the coarse material, and a low velocity zone for the smaller particles. With an internal horizontal segregation in each compartment, a random exchange of particles between compartments will give an overall classification from compartment to compartment. In addition, the overall circular bed movement will secure a movement of larger particles towards the outlet along the floor, and of fine particles back towards the inlet at the top of the bed. The invention will be further explained and envisaged in the following figures and example.

The geometry of the baffles and shape of the classifying area must be tailored to, fit the actual granulation system. The baffles provide a multistage classification system, with a certain efficiency over each stage. The baffles divide the granulator into a series of steps resembling a multistage reactor. The achieved effect resembles a plug flow and, combined with the controlled recycle of fine particles over the top of the plates, gives a multiple stage classifying effect like in a distillation column. The size distribution of the product leaving the bed is clearly narrower than the total size distribution of the product contained in the granulator.

The air flow direction at the upper portion of the fluidized area in the classifying area transports the smaller particles towards the growth area of the bed, where they function as seed material. The overall air flow above the top of the bed level, together with the mechanical design, wind screens the granules and sends the smallest to the granulation zone and allows the large particles to leave as product.

Provided a uniform size distribution of the feed to the granulator, the retention time distribution will also be narrowed, with a design according to the present invention.

There are various ways of providing seeding to a granulator without crushing a part of the product. A pre-agglomeration or a small prilling tower has been proposed, as well as installing a grinder or crusher inside the bed. A rotor with a variable speed can be utilized to provide seed material and control the product particle size.

BRIEF DESCRIPTION OF THE DRAWINGS

The invention will be further explained and envisaged in the following figures and example.

DETAILED DESCRIPTION OF THE INVENTION

Figure 1:
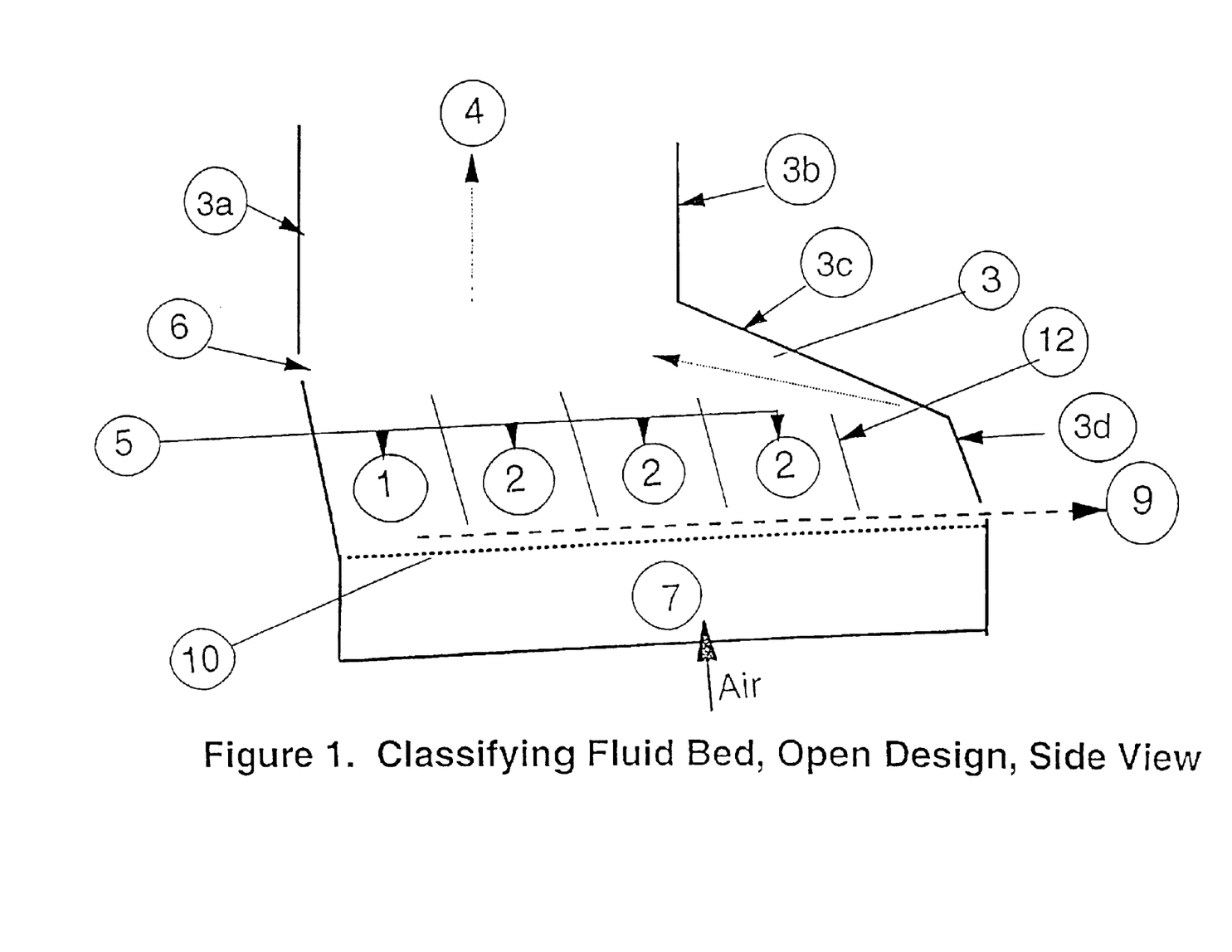
FIG. 1 is a side view (in a reduced scale) of one design of the classifying fluid bed granulator according to the present invention, with a sloped bed floor and tilted baffle plates.
Figure 2:
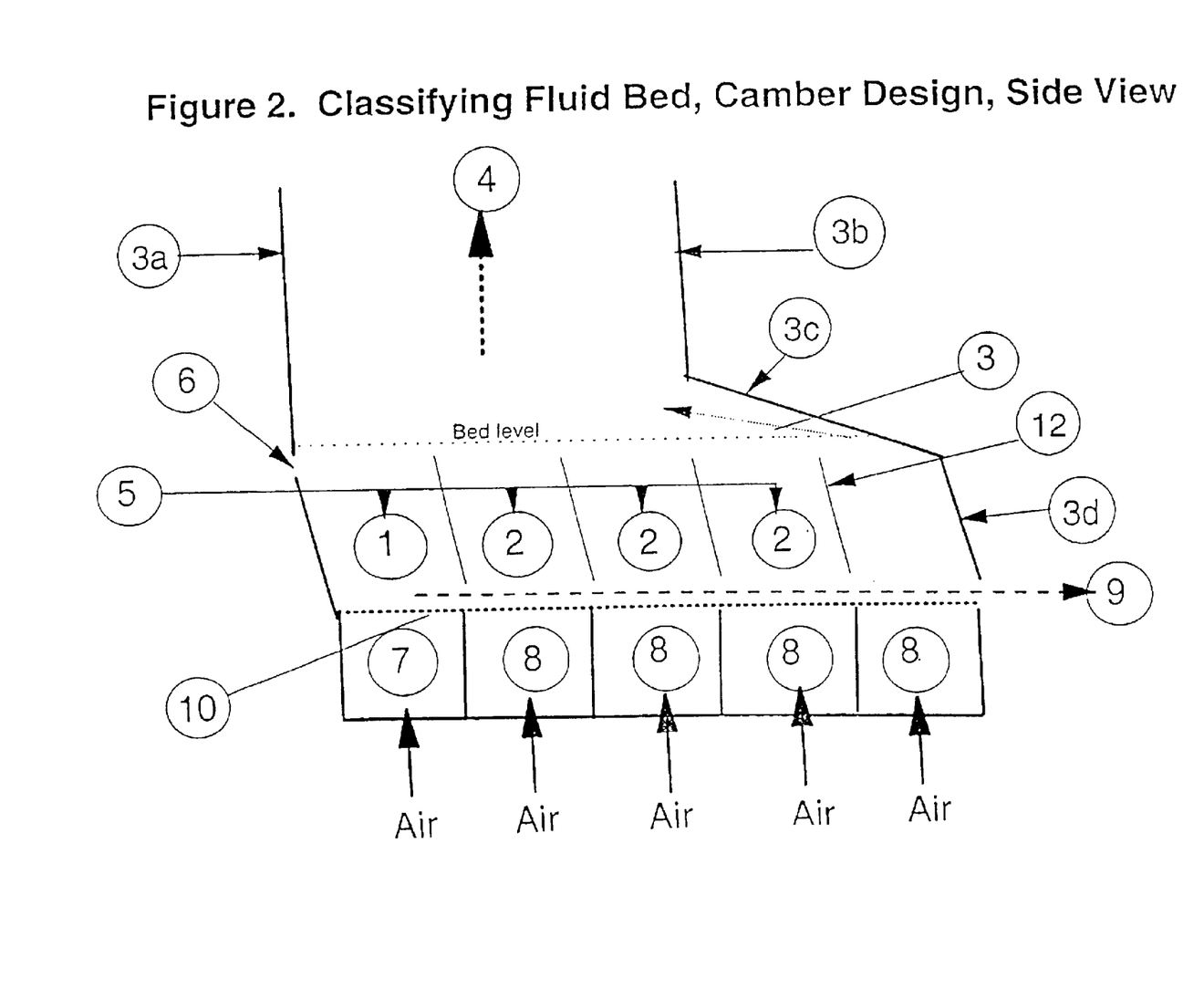
FIG. 2 is a side view (in a reduced scale) of an alternative design of the classifying fluid bed granulator according to the present invention, with a horizontal bed floor, tilted baffle plates and a fluidized air chamber divided into compartments.
Figure 3:
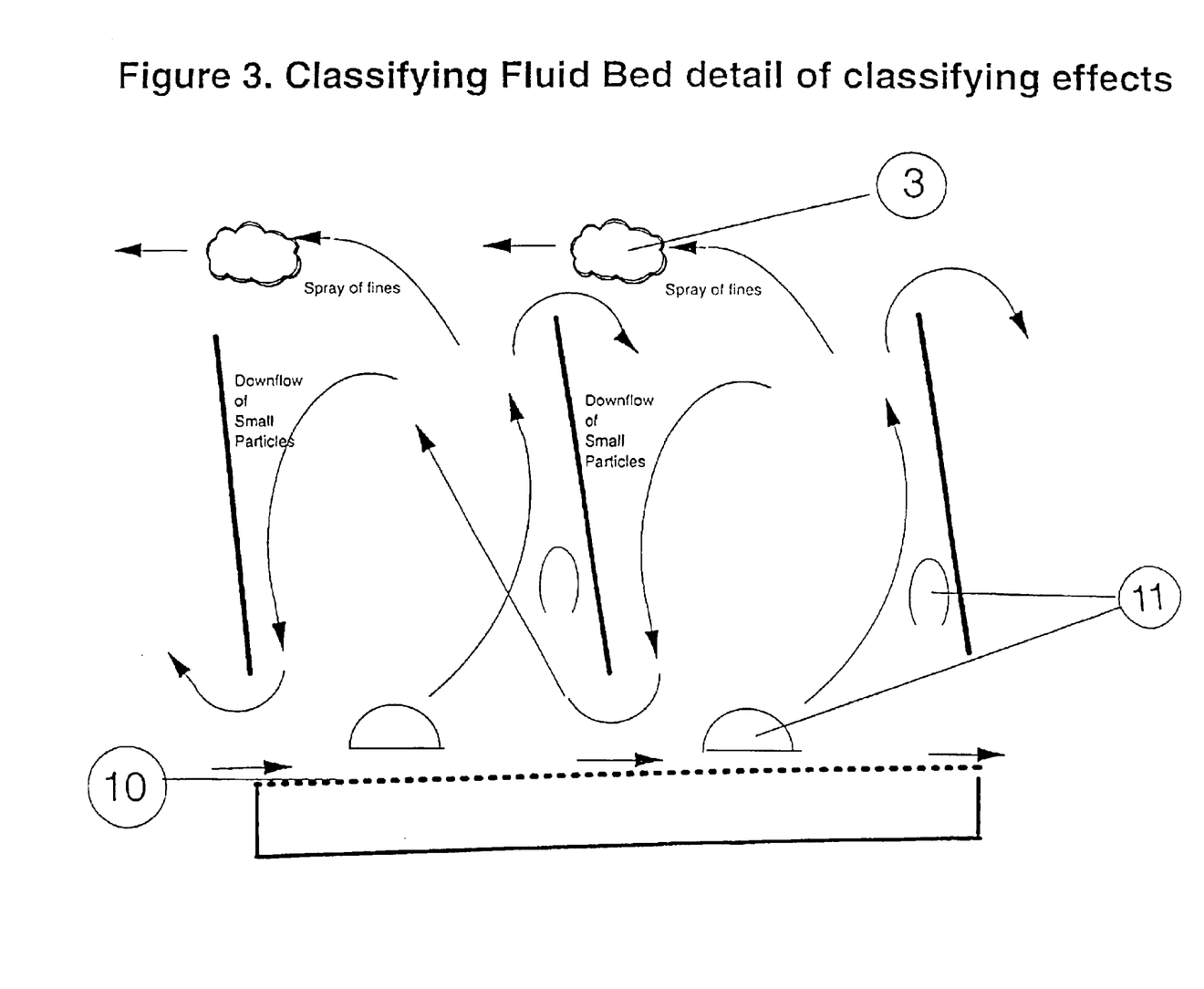
FIG. 3 is a schematic view illustrating the classification effects in the classifying fluid bed granulator according to the present invention.

FIGS. 1 and 2 show a fluid bed granulator which comprises a typical agglomeration and seed control section (i.e., an agglomeration section) 1, a granulation and classification section (i.e., a classification section) 2, an air pressure chamber 7, and a horizontal uphill-sloped bed floor 10. Section 2 contains tilted (inclined) baffle plates 12. Furthermore, the granulator consists of an inlet 5 for feeding the melt, solution, emulsion, slurry, solids or suspension into section 1, an inlet for seed material 6, an outlet 4 defined by walls 3a,3b for discharging air, a ceiling 3c, an end wall 3d and an outlet 9 for discharging produced granules of desired size. As illustrated in FIGS. 1–3, each baffle plate 12 has a free upper edge (i.e., an upper edge that is not adjoining a wall or another component so that there is a gap or open space above the free upper edge), and has a free lower edge (i.e., a lower edge that is not adjoining a wall or another component so that there is a gap or open space below the free lower edge). Therefore, granules are able to travel over and under each baffle plate within the granulator, as shown in FIG. 3.

In the agglomeration and seed control section 1, which may consist of one or more consecutive compartments, the melt, suspension, slurry, solids or solution is sprayed onto the seed particles where it solidifies creating agglomeration or layering. Necessary seed production can be done outside or inside the fluid bed by means of physical crushing.

The compartment(s) in section 1 may perform as a turbulent total mixed reactor(s), which is necessary to achieve high capacity of melt injection without creating excess agglomeration and lump formation. Low air velocity provides more agglomeration, reduces the dust formation, and reduces the carryover of dust with air exiting the bed 4. The total load and air velocity in section 1 may in this way be used to control the seed production and granulometry of the whole bed. The spraying technique may be with two-phase or one phase nozzles. Nozzle direction may also vary depending on the individual properties between melt or solution systems. The transport: of the largest particles from section 1 to section 2 takes place along the floor 10, and is caused; by the rotational driving force in the total bed due to the slope of the floor, the difference in fluidization air rate, and/or due to directional nozzles in the bed floor. Some large particles are also carried over at the top of the bed where the bubble breaking randomly sends particles in all directions. The larger particles are less affected by the horizontal air flow on the top of the bed, and will move to the compartment closer to the outlet easier than the smaller particles which will be taken by the horizontal air flow back into the existing compartment or to the compartment closer to the inlet.

The air velocities in the granulation and classification section 2 may be higher than in the agglomeration and seed control section 1, and the air velocity should also be higher for each compartment towards the outlet 9 as a requirement for fluidizing the increased particle size, but also as an important factor for the overall classification. A higher fluidization air velocity provides a higher air pressure in the bed and a higher level in the bed. The horizontal gradient in air and bed pressure gives an average horizontal air flow component in the bed, which provides a horizontal segregation. Smaller particles are blown back towards the agglomeration and seed control section 1. The air chamber 7 may comprise consecutive compartments. One way of achieving a higher fluidization air velocity towards the outlet is to reduce the pressure drop over the bed floor 10 towards the outlet, or to increase the pressure in the consecutive air compartments towards the outlet. The pressure drop can be adjusted by the size or number of openings in the perforated bed floor.

The bed height will also affect the air velocity. A higher bed level produces a higher pressure drop and lower air flow for that area. This can be achieved by the slope of the bed floor 10 as shown in FIGS. 1 and 2. A higher air flow in chamber(s) in the granulation section 2 towards the outlet 9 gives a higher average level of material in the these sections and compartments, and there will be a transport of smaller particles from the upper zone 3 in these sections back to the agglomeration and seed control section 1. This effect is further enhanced by the free airflow zone 3 towards the air outlet 4.

Cooling, if required, is provided by low temperature fluidization air, and/or with internal cooling plates or tubes submerged horizontally or vertically within the fluidized material in the bed.

In the granulation and classification section 2, it is important to break or control the bubbles which are formed in a fluidized high density bed. These bubbles transport coarse material from the bottom to the top of the bed. With the horizontal asymmetry in both air velocity and geometry, the bubbles 11 (as shown in FIG. 3) move horizontally towards the tilted baffle or compartment wall where they change shape, leaving the coarse material as the bubbles rise along the baffle and break through the surface of the material contained in the bed. At the breakthrough of the bubbles, the ejection of material gives a transport of fine material backwards and coarse material forward in the bed.

Figure 4:
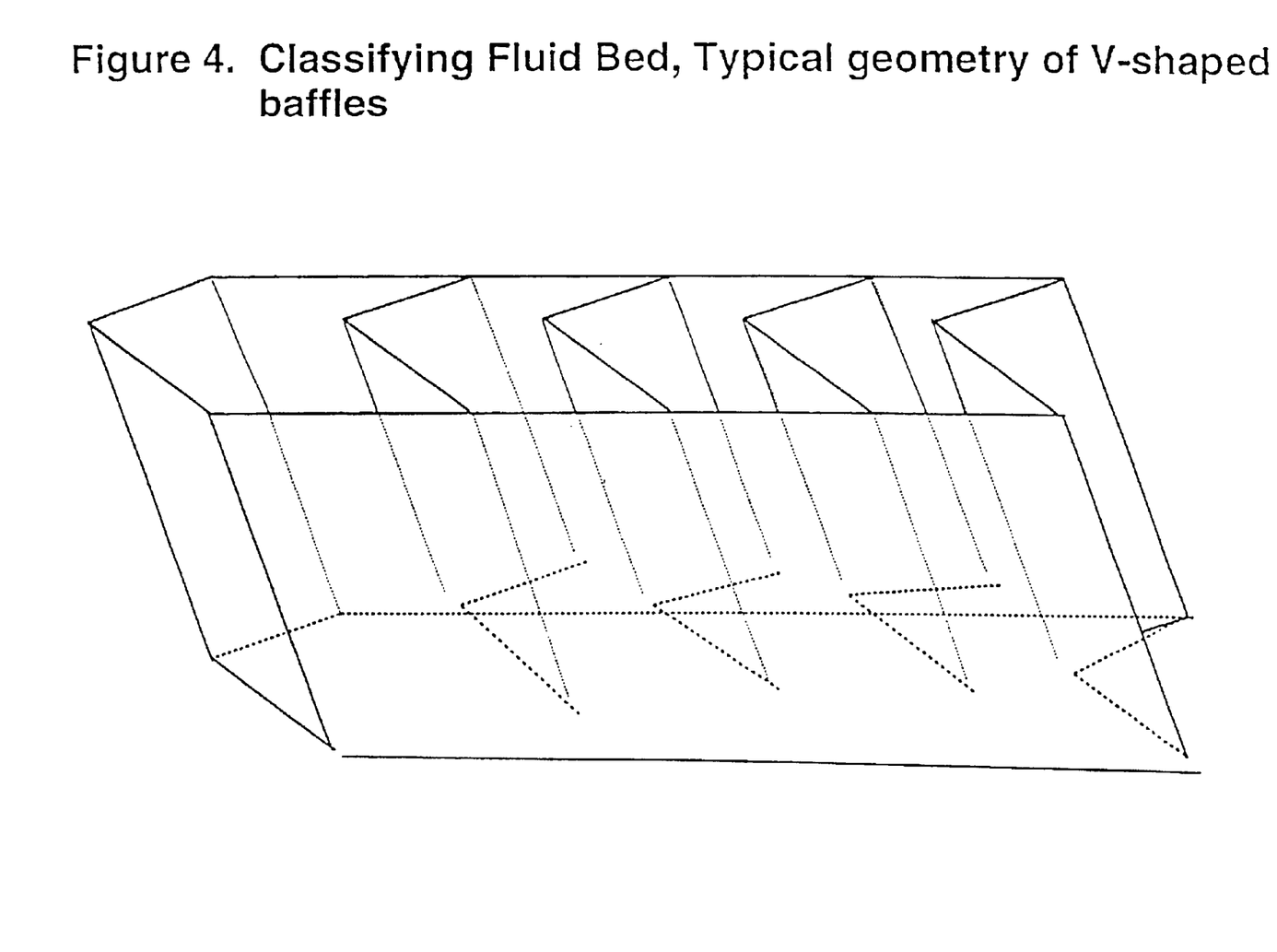
FIG. 4 is a geometrical sketch of how V-shaped baffles can be installed in the granulator according to the present invention.
Figure 5:
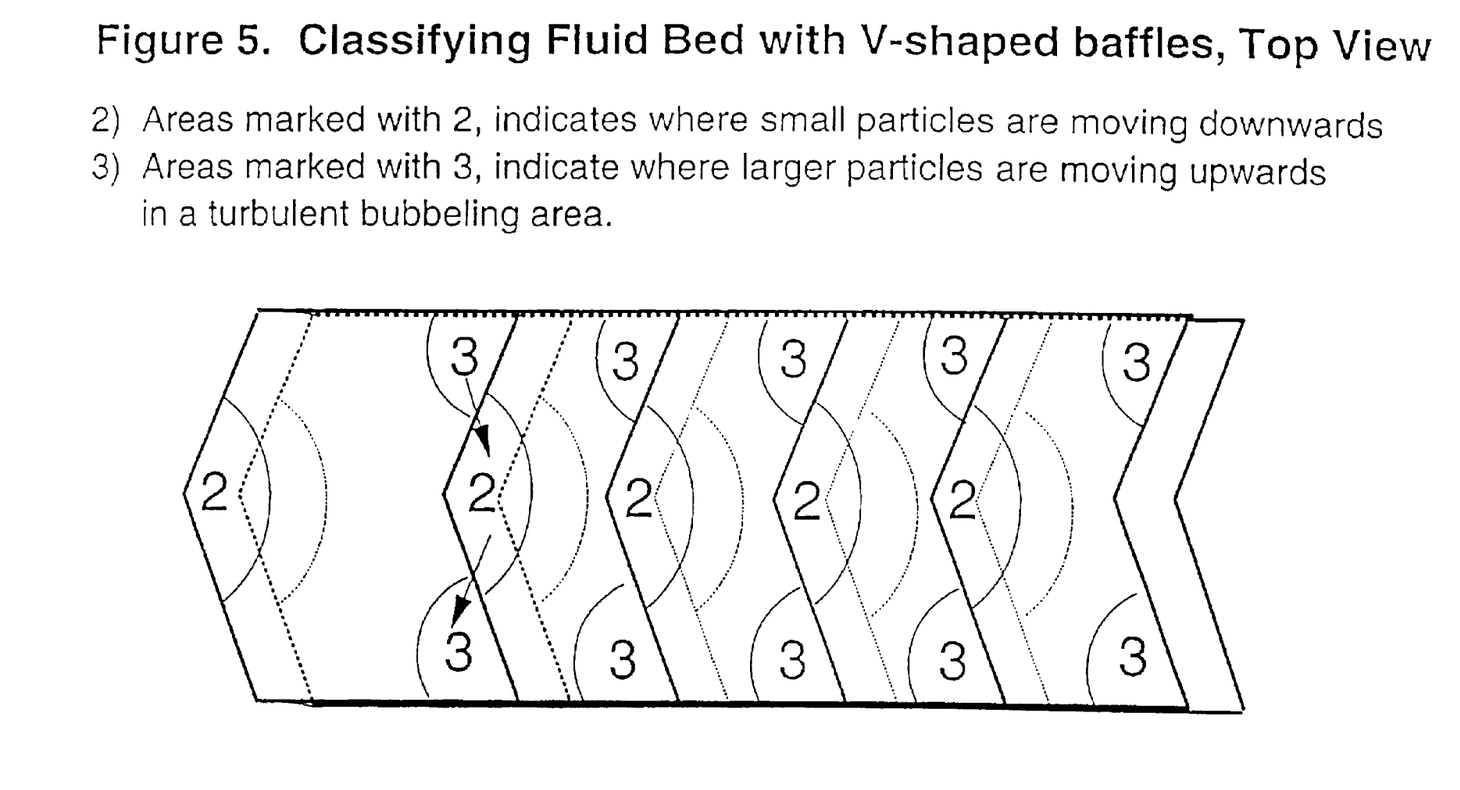
FIG. 5 is a schematic view illustrating how V-shaped baffle plates will further enhance the effect of the baffles.

On the other side of the baffle, smaller particles will be increasingly concentrated in a downward movement. The lack of turbulence and lower air velocity favors collection of small particles. The smaller particles will be moving downwards, under the baffle and into the next chamber or section. The distance from the lower end (free lower edge) of the baffle plate to the bed floor, should be tuned to achieve a stable circular movement between the plates, and to achieve sufficient transport between the chambers. The angle and shape of the baffle plates are important to achieve the right flow pattern. The transport of particles on both sides of the baffle plate can further be improved by V-shaping the plate, making the transfer between chambers even better, as shown in FIGS. 4 and 5.

The raising bubbles of coarse material in zone 3 transport coarse material up and over to the downward fine material zone 2 in the next compartment. In the same way, small particles in 2 will be transferred back to zone 3 in the previous compartment. At the top and bottom of the bed, below and above the baffles, a random movement pattern will secure exchange between the compartments.

EXAMPLE

Figure 6:
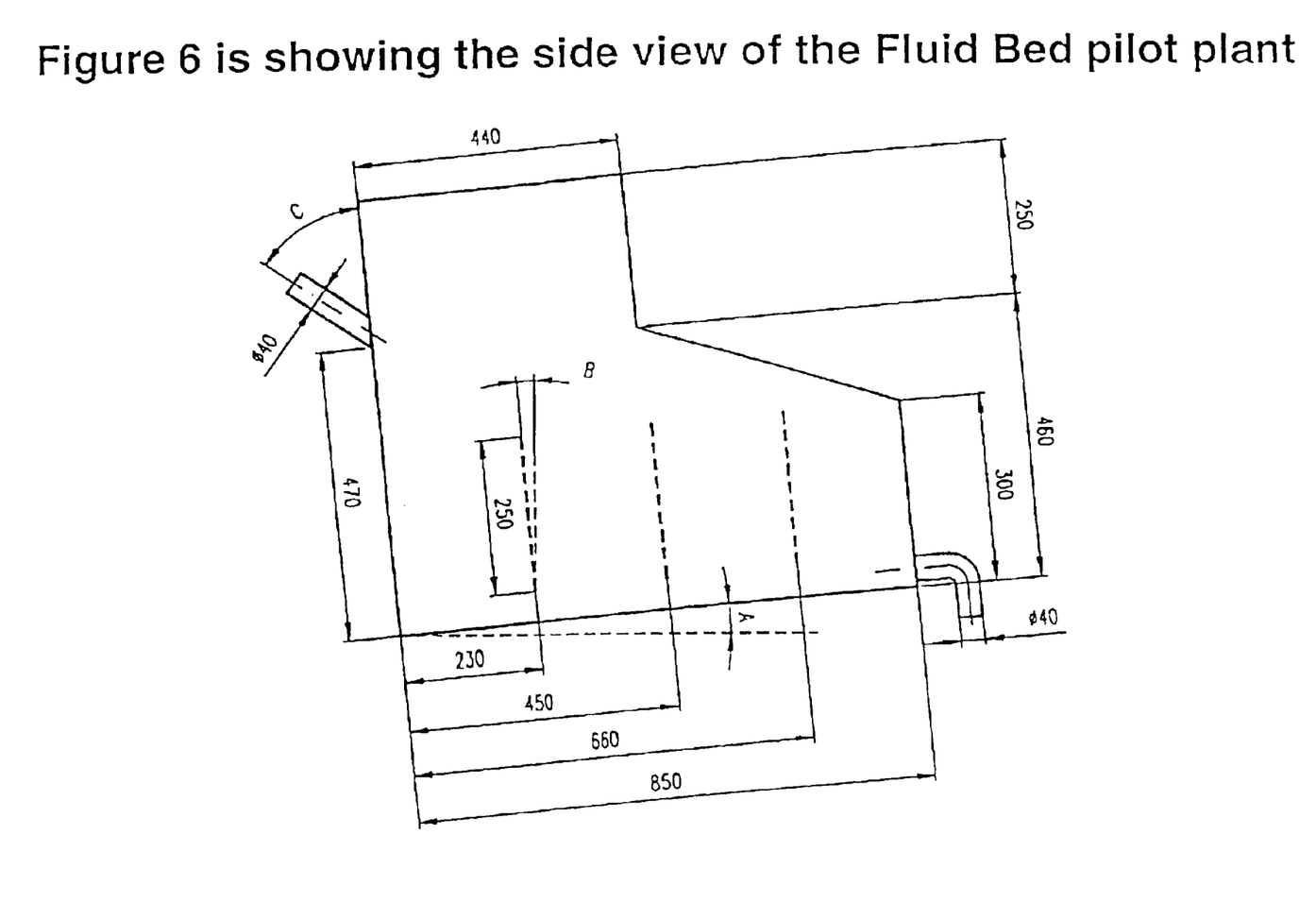
FIG. 6 is a side view of a pilot unit of the granulator according to the present invention.

This example shows test results achieved with a classifying fluid bed granulator unit as shown in FIG. 6. The unit was operated with the following parameters:

Material: Urea granules with a bulk density of 1000 kg/m$^3$
Air velocity: 1.1–1.4 m/s
Air temperature: Ambient, 20–22° Celsius
Bed filling: 32.5–37 kg
Bed slope, $\alpha$: 6°
Baffle slope $\beta$: 15°.

Typical size distribution of the material in the test bed is shown in Table 1:

TABLE 1

| Typical size distribution in test bed | |
|---|---|
| Above 6 mm | 1% |
| Between 6.3–4.5 mm | 9% |
| Between 4.5–3.5 mm | 28% |
| Between 3.5–2.5 mm | 49% |
| Between 2.5–1.6 mm | 11% |
| Between 1.6–1.0 mm | 2% |
| Between 1.0–0.0 mm | 0% |

The tests have been performed with the aim of finding the most effective design, and a classification efficiency measurement has been introduced. The measurement calculates how the D50 of the outlet product compares to the D50 for the whole content in the bed. If the D50 of the outlet is equal to the total bed D50, the classification efficiency is 0%, which means there is no effect as compared to a total mixed bed. If the D50 of the outlet is equal to D90 of the whole bed, the classification efficiency is 80%. The D50 is the granule diameter which splits the mass into 50% of the granules smaller than this diameter and subsequently 50% of the granules larger. The D90 is (in the same way) the granule diameter which splits the mass into 90% of the granules smaller than this diameter, and subsequently 10% of the granule mass larger this diameter.

Figure 7:
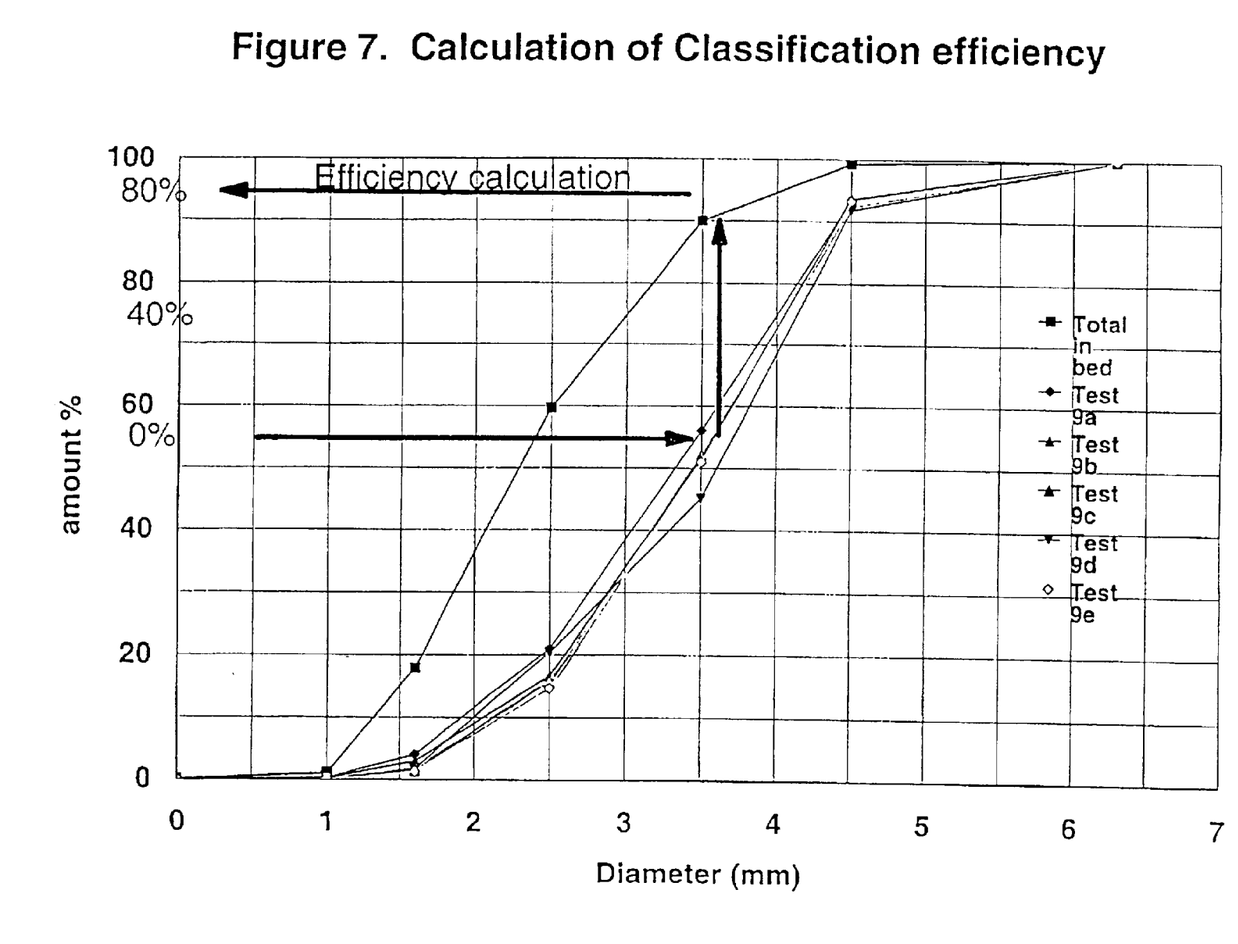
FIG. 7 is a graph illustrating the classification efficiency calculation.

FIG. 7 illustrates the classification efficiency calculation.

The bed efficiency has been tested both in dynamic and static situations, static meaning that the bed has been filled and operated without any discharge or feed of material. Sampling of the outlet has been done only to check that steady state has been achieved.

The dynamic tests were simulated by taking out product at the outlet and refeeding it to the inlet. The load has been calculated as retention time. Simulated retention time of 10 minutes has been used in the dynamic testing.

Figure 8:
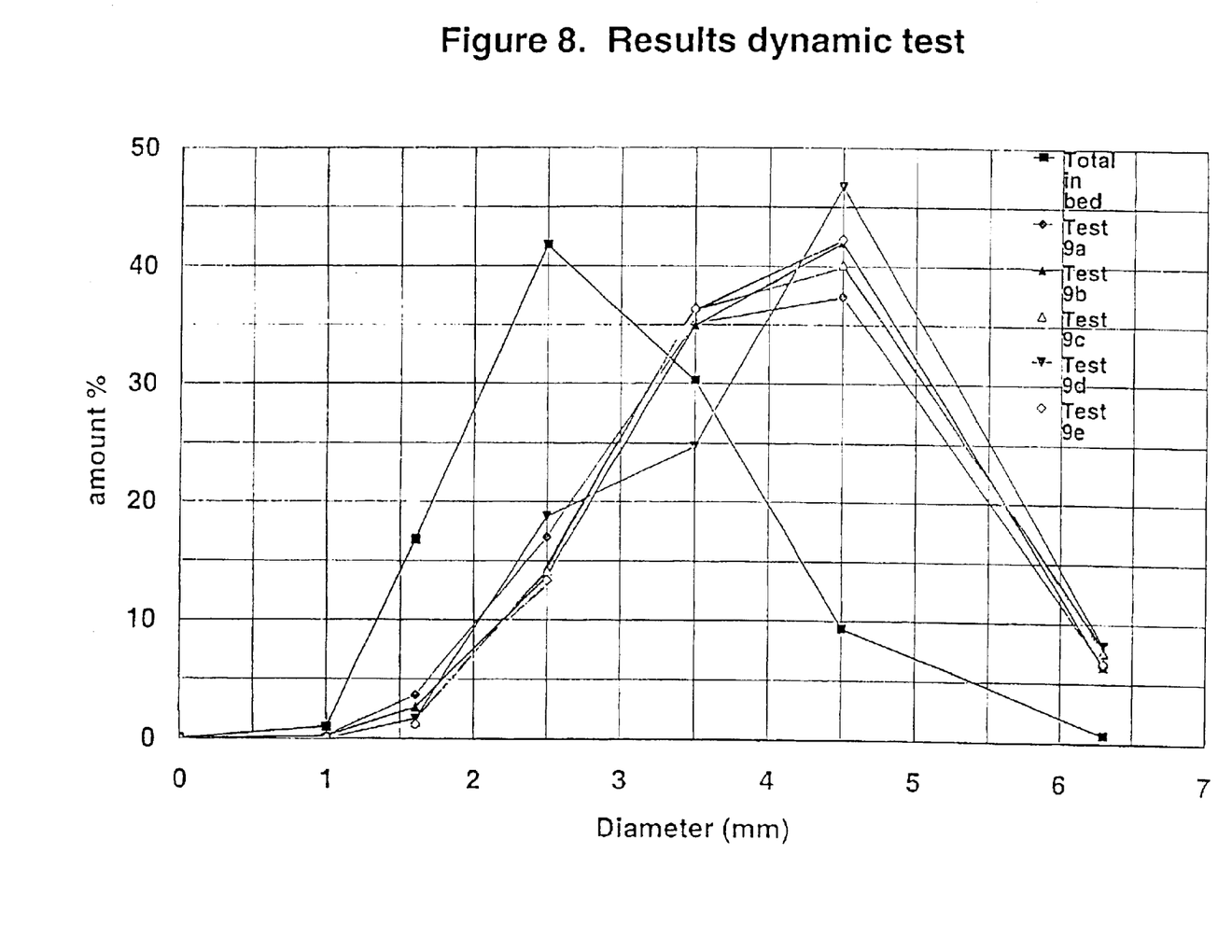
FIG. 8 is a graph illustrating the results of the dynamic tests.
Figure 9:
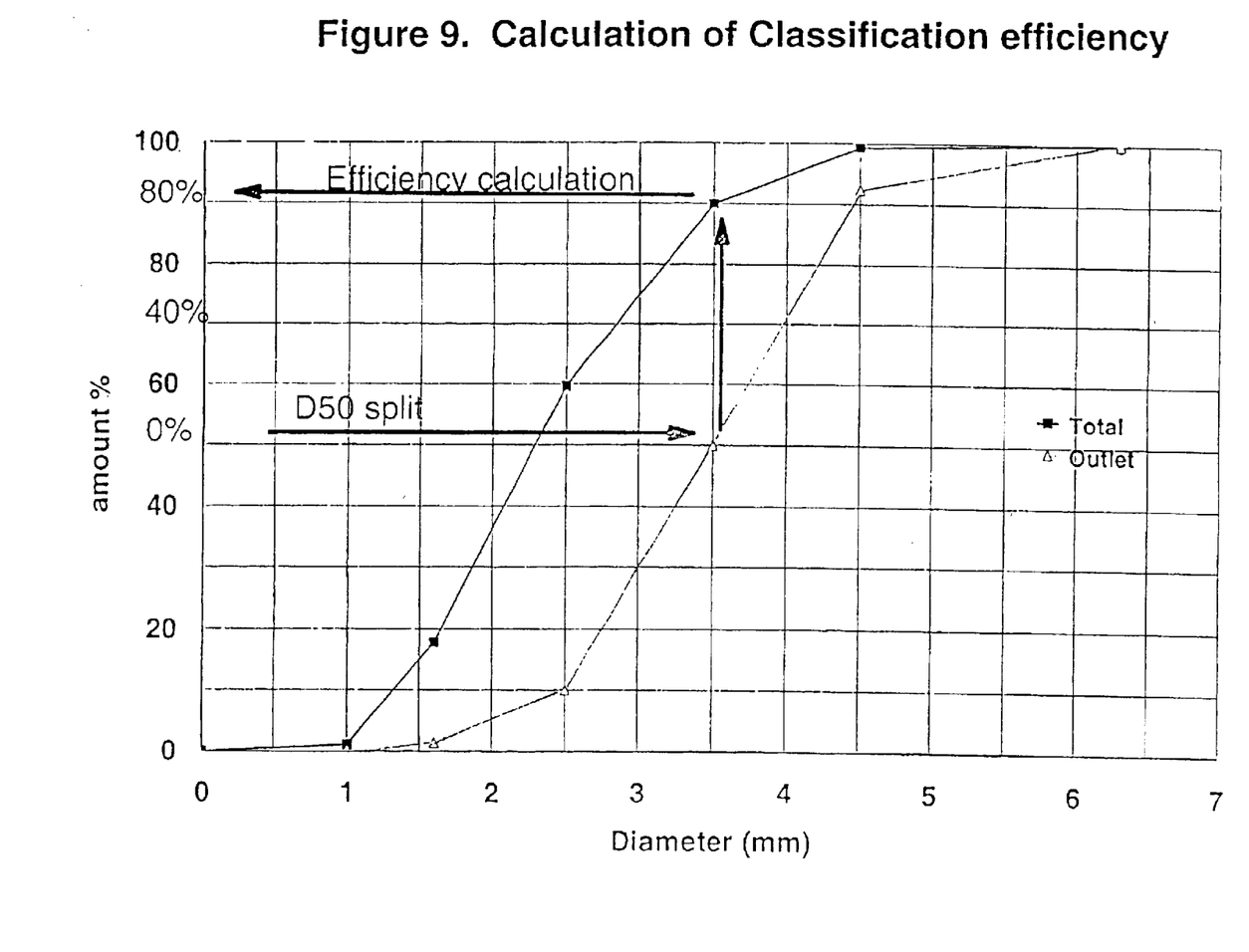
FIG. 9 is a graph illustrating the classification efficiency calculation.

FIGS. 8 and 9 illustrate the results of the tests. FIG. 8 shows how the size distribution curve of the outlet changes compared to the total content of the bed. FIG. 9 shows the same for the accumulated size distribution curve.

Table 2 shows a representative extract of the classification efficiency results. The best results are achieved with three baffles tilted 15 degrees, and a bed sloped 6 to 10 degrees. Positive results are, however, achieved with several features as indicated in the table.

TABLE 2

Test results

| Test No. | Number of Baffles | Slope of Baffles in degrees | Slope of Bed in degrees | Ceiling position | Load as retention time | Classification efficiency |
|---|---|---|---|---|---|---|
| 0 | One | As for Bed | 0 | No ceiling | No load | 0% |
| 5 | " | " | 0 | Ceiling down | No load | 13% |
| 3 | " | " | 4 | Ceiling down | 30 min. | 36% |
| 4 | " | " | 4 | Ceiling down | 10 min. | 48% |
| 5 | " | " | 4 | Ceiling down | No load | 50% |
| 6 | " | " | 6 | Ceiling down | 10 min. | 54% |
| 7 | " | " | 10 | Ceiling down | 10 min. | 45% |
| 8 | Three | 4 | 4 | Ceiling down | 10 min. | 72% |
| 9 | " | 15 | 4 | No ceiling | 10 min. | 82% |
| 10 | " | 15 | 4 | Ceiling down | 10 min. | 64% |

Test number 10 was done with a higher bed level, which created a change in fluidization conditions towards the outlet of the bed due to restrictions.

The present invention will open for granulation without screening and recycling granules outside the bed, given only a suitable seeding process or a feed of seed material.

As an example, the fluid bed will be perfect for fattening or post granulation of smallprilled particles of 1–2 mm to larger granules of 3–7 mm.

What is claimed is:

1. A classifying fluid bed granulator comprising:
    a granulation chamber having an agglomeration section and a classification section, said granulation chamber including:
        a bed floor;
        a ceiling above said bed floor;
        an end wall between said bed floor and said ceiling;
        a feed material inlet at said agglomeration section;
        a seed inlet at said agglomeration section;
        an air outlet; and
        a granule outlet at said classification section such that said classification section is located closer to said granule outlet than is said agglomeration section, wherein a bed floor of said classification section is sloped upwards toward said granule outlet so as to form an angle with a horizontal plane, and an entirety of said bed floor of said granulation chamber is sloped upwards toward said granule outlet so as to form an angle with the horizontal plane; and
    a fluidizing air chamber for supplying fluidizing air to said granulation chamber;
    wherein said classification section includes at least one asymmetrically-shaped compartment, each of said at least one asymmetrically-shaped compartment including a baffle plate having a free lower edge closest to said bed floor and having a free upper edge opposite said lower edge and closest to said ceiling.

2. The classifying fluid bed granulator of claim 1, wherein said baffle plate of each of said at least one asymmetrically-shaped compartment is inclined at an angle with respect to the horizontal plane.

3. The classifying fluid bed granulator of claim 2, wherein said baffle plate of each of said at least one asymmetrically-shaped compartment is inclined at an angle other than 90° with respect to the horizontal plane.

4. The classifying fluid bed granulator of claim 2, wherein said baffle plate of each of said at least one asymmetrically-shaped compartment is inclined at an angle of one of 4° and 15° with respect to the horizontal plane.

5. The classifying fluid bed granulator of claim 2, wherein said baffle plate of each of said at least one asymmetrically-shaped compartment comprises a V-shaped baffle plate.

6. The classifying fluid bed granulator of claim 2, wherein said baffle plate of each of said at least one asymmetrically-shaped compartment is inclined at an angle other than 90° with respect to the horizontal plane.

7. The classifying fluid bed granulator of claim 1, wherein said bed floor is sloped upwards toward said granule outlet so as to form an angle in a range of 6° to 10° with the horizontal plane.

8. The classifying fluid bed granulator of claim 1, wherein said agglomeration section includes a plurality of consecutively-arranged compartments.

9. The classifying fluid bed granulator of claim 1, wherein said fluidizing air chamber includes a plurality of consecutively-arranged air compartments.

10. The classifying fluid bed granulator of claim 1, wherein said bed floor is arranged between said granulation chamber and said fluidizing air chamber, said bed floor including perforations having different sizes so as to provide a different amount of air from said fluidizing air chamber to said agglomeration chamber than from said fluidizing air chamber to said classification chamber.

11. The classifying fluid bed granulator of claim 1, wherein said granule outlet is located at said end wall, and said end wall slopes inwardly toward said seed inlet and said feed material inlet.

12. The classifying fluid bed granulator of claim 11, wherein said ceiling slopes downwardly toward said granule outlet.

13. The classifying fluid bed granulator of claim 1, wherein said classification section of said granulation chamber includes a plurality of asymmetrically-shaped and consecutively-arranged compartments, said baffle plate of each of said compartments being inclined with respect to the horizontal plane at an angle other than 90°.

14. The classifying fluid bed granulator of claim 1, wherein a bed floor of said classification section is sloped upwards toward said granule outlet so as to form an angle in a range of 4° to 10° with the horizontal plane.

15. The classifying fluid bed granulator of claim 1, wherein said baffle plate of each of said at least one asymmetrically-shaped compartment comprises an inclined flat baffle plate.

16. A classifying fluid bed granulator comprising:
    a granulation chamber having an agglomeration section and a classification section, said granulation chamber including:

a bed floor;

a ceiling above said bed floor;

an end wall between said bed floor and said ceiling;

a feed material inlet at said agglomeration section;

a seed inlet at said agglomeration section;

an air outlet; and a granule outlet at said classification section such that said classification section is located closer to said granule outlet than is said agglomeration section; and a fluidizing air chamber for supplying fluidizing air to said granulation chamber;

wherein said classification section includes at least one asymmetrically-shaped compartment, each of said at least one asymmetrically-shaped compartment including a baffle plate having a free lower edge closest to said bed floor and having a free upper edge opposite said lower edge and closest to said ceiling, and wherein each of said at least one asymmetrically-shaped compartment is defined by said baffle plate inclined at an angle with respect to a horizontal plane and by said bed floor sloping upwards toward said granule outlet so as to form an angle with the horizontal plane.

17. A method of fluid bed granulation, comprising:

supplying a feed material into an agglomeration section of a granulation chamber, the feed material comprising one of a solution, a slurry, a melt, an emulsion, a suspension, and solids;

supplying seed particles into the agglomeration section of the granulation chamber;

granulating the seed particles with the feed material in the agglomeration section so as to form granules having a controlled size; and classifying the granules according to size in a classification section of the granulation chamber, the classification section located downstream of the agglomeration section and including a granule outlet and at least one asymmetrically-shaped compartment, each of the at least one asymmetrically-shaped compartment including a baffle plate having a free lower edge closest to a bed floor of the classification section and having a free upper edge opposite the lower edge and closest to a ceiling of the classification section, said classifying of the granules comprising supplying fluidizing air to the granulation chamber so as to classify the granules by transporting the granules over the free upper edge and under the free lower edge of the baffle plate of each of the at least one asymmetrically-shaped compartment, wherein said supplying of the fluidizing air to the granulation chamber comprises supplying the fluidizing air so as to produce a rotating flow of the granules in the granulation chamber, wherein the rotating flow is produced by at least one of:

providing an upwardly-sloped bed floor toward the granule outlet and providing an end wall at the granule outlet inclined inwardly toward the agglomeration section;

varying the supply of fluidizing air such that a fluidizing air velocity in the classification section is higher than a fluidizing air velocity in the agglomeration section; and supplying the fluidizing air using directional nozzles in a bed floor of the granulation chamber.

18. The method of claim 17, wherein the classification section includes a plurality of asymmetrically-shaped compartments, each of the compartments being including an inclined baffle plate for separating the compartments.

19. The method of claim 18, wherein the granule outlet is provided at an end of the classification section farthest from the agglomeration section, said supplying of the fluidizing air to the granulation chamber comprising supplying the fluidizing air such that a fluidizing air velocity in one of the compartments of the classification section closest to the granulate outlet is higher than a fluidizing air velocity in one of the compartments of the classification section farthest from the granule outlet.

20. The method of claim 17, wherein said supplying of the fluidizing air to the granulation chamber comprises supplying the fluidizing air such that a fluidizing air velocity in the classification section is higher than a fluidizing air velocity in the agglomeration section, whereby granules smaller than a desired size are transported back toward the agglomeration section of the granulation chamber.

21. The method of claim 17, wherein the bed floor of the classification section is sloped upwards toward the granule outlet so that the bed floor forms an angle with a horizontal plane.

* * * * *